(No Model.) W. M. FOWLER 2 Sheets—Sheet 1.
FILTER.

No. 565,890. Patented Aug. 18, 1896.

Witnesses
R. B. Seward.
George Barry.

Inventor:
William M. Fowler
by attorneys,
Brown & Seward (No Model.) 2 Sheets—Sheet 2.

W. M. FOWLER.
FILTER.

No. 565,890. Patented Aug. 18, 1896.

Witnesses:

Inventor:
William M. Fowler
by attorneys

UNITED STATES PATENT OFFICE.

WILLIAM MILES FOWLER, OF STAMFORD, CONNECTICUT.

FILTER.

SPECIFICATION forming part of Letters Patent No. 565,890, dated August 18, 1896.

Application filed July 27, 1895. Serial No. 557,324. (No model.)

*To all whom it may concern:*

Be it known that I, WILLIAM MILES FOWLER, of Stamford, in the county of Fairfield and State of Connecticut, have invented a new and useful Improvement in Filters, of which the following is a specification.

My invention relates to an improvement in filters in which provision is made for increasing or diminishing at pleasure the number of strata or perforated diaphragms through which the liquid to be filtered is to pass.

A practical embodiment of my invention is represented in the accompanying drawings, in which—

Figure 1:
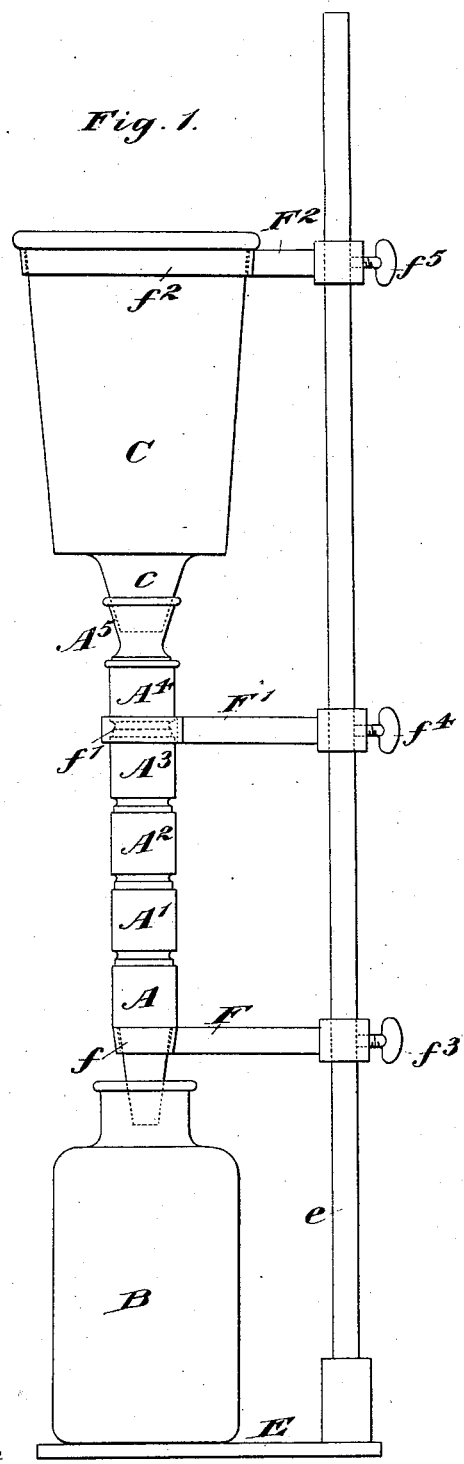
Figure 5:
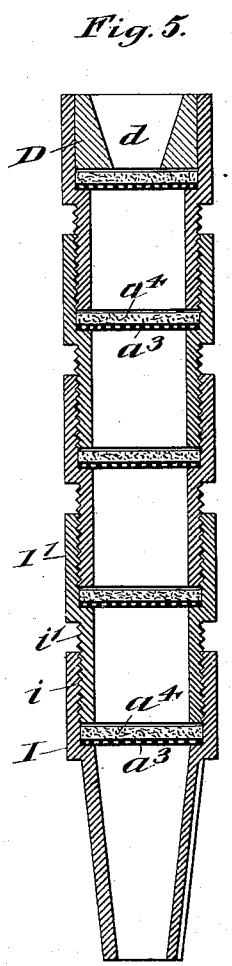
Figure 2:
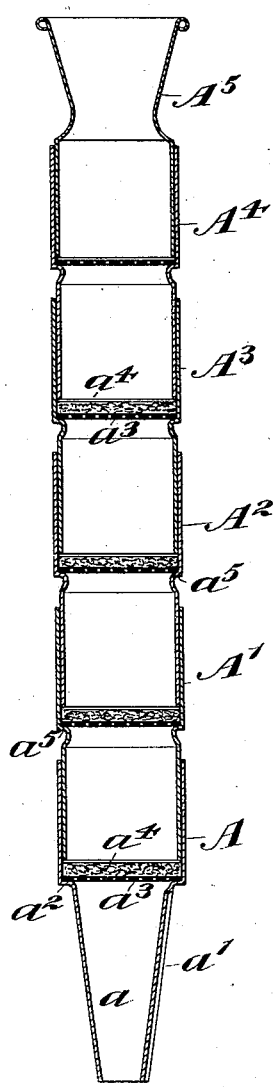
Figure 3:
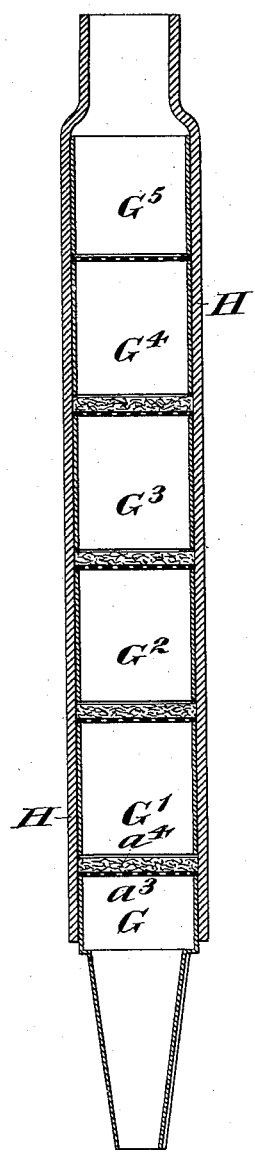
Figure 4:
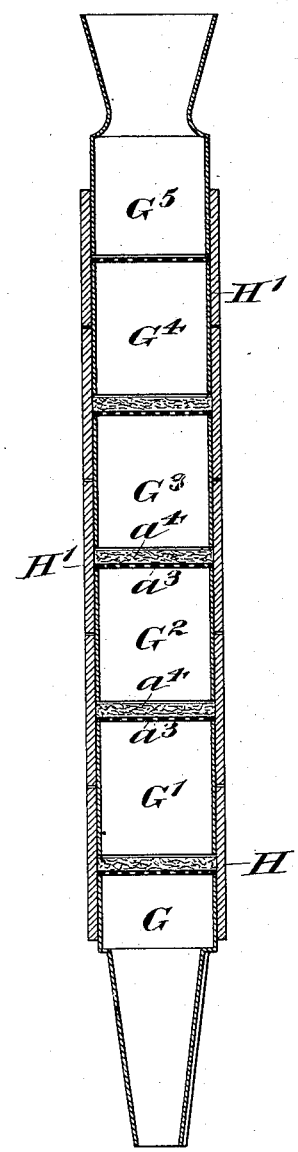

Figure 1 represents one form of the filter in side elevation, showing its support-stand as in use. Fig. 2 is an enlarged vertical section through the filter. Fig. 3 is a vertical section through a modified form of the filter. Fig. 4 is a similar view through a second modified form, and Fig. 5 is a similar section through a third modified form.

The filter is made up of several tubular sections held in alinement with perforated diaphragms and strata of filtering material interposed between the adjacent ends of the sections. In the form shown in Figs. 1 and 2 the sections telescope one another. In the form shown in Fig. 3 they are held together by a flexible tube in which the sections are inserted. In the form shown in Fig. 4 they are held together by a series of external tubes which break joints with the tubular filter-sections, and in Fig. 5 the filter-sections are screwed the one into another.

Referring to the form shown in Figs. 1 and 2, the lower filter-section A is conveniently provided with a tapered nozzle $a$, having a groove $a'$ formed along one of its walls to permit the escape of air from the nozzle represented by B when it is found desirable to fit the tapered nozzle $a$ snugly into the mouth of the nozzle which is to receive the filtered liquid. At the top of the tapered portion $a$ the section A is abruptly increased in diameter, forming a shoulder $a^2$ for the reception of a perforated diaphragm $a^3$, which is intended to be the diameter of the upper cylindrical portion of the section A and, when inserted therein, to rest upon the shoulder $a^2$. On the perforated diaphragm $a^3$ there is placed a stratum $a^4$ of cotton, felt, or other porous material suitable for filtering purposes, and upon the upper side of the stratum $a^4$ of filtering material the lower end of the filtering-section A' is intended to rest when its lower end has been inserted within the upper cylindrical end of the section A. It is intended that the lower end of the section A' shall fit, with a free sliding movement, within the upper end of the section A, and as nearly liquid-tight as may be consistent with such sliding movement. The joint between the telescoping sections is sealed liquid-tight when the parts are assembled by the pressure of the lower end of the section A' on the filtering material $a^4$ at its outer edge, which pressure compresses the filtering material sufficiently to close said joint. The filtering-section A' is provided with an annular depression forming a shoulder $a^5$ for the reception of a perforated diaphragm, quite similar to the diaphragm $a^3$, and on the diaphragm $a^3$ there is placed a stratum of filtering material, such, for example, as that represented by $a^4$, and in turn again a third section A² is fitted to slide within the upper portion of the section A' and compress the filtering material between its lower end and the edge of the perforated diaphragm. In the same manner the additional sections A³ A⁴ are made to fit within the respective sections beneath them and press between their ends and the shoulders on the sections below them the strata of filtering material.

Within the top of the upper filtering-section $a^4$ there is fitted a section A⁵, the lower portion of which is quite similar to the lower portions of the sections below it, while its upper portion is made funnel-shaped for receiving the spout or nozzle $c$ of the supply vessel C, in which the liquid to be filtered is deposited. The nozzle $c$ may be made to fit within the tapered portion A⁵ without any special packing, or there may be inserted within the tapered section A⁵ a cork cushion, such, for example, as that shown in Fig. 5 and represented by D.

For the purpose of holding the filter and the supply vessel in convenient position for doing their work I provide a stand consisting of a base E, from which a rod $e$ uprises, and on the rod $e$ I slip the stems of brackets F F' F², which have at their free ends arms or branches $f f' f^2$, which partially or completely surround the portions of the filter and supply vessel with which they engage. The portions of the brackets F F' F² which slide on the standard $e$ are provided with set-screws $f^3$ $f^4 f^5$ for the purpose of fastening the brackets to the standard in the desired vertical adjustments.

The bracket F fits the tapered portion $a$ of the lower section A and rests underneath the shoulder $a^2$ for supporting the weight of the column of filtering-sections. The bracket F² rests underneath the top flange of the supply vessel, while the bracket F' serves as a guide to keep the column from buckling.

It is evident that the number of sections A A' A², &c., may be increased or diminished at pleasure, it being understood that the sections other than the bottom and top sections are quite similar in form and size.

In the form represented in Fig. 3 the filtering sections (represented by G, G', G², G³, G⁴, and G⁵) consist, with the exception of the lower section G, which is quite similar in shape to the hereinabove-described section A, of short tubes of substantially the same diameter having interposed between their adjacent ends the perforated diaphragm and layer of filtering material, such as those represented by $a^3$ and $a^4$, and the several sections with their interposed layers of filtering material are held in assembled adjustment by means of an exterior flexible tube H, which may be of india-rubber or other suitable material and which extends continuously over several successive tubular sections. This form of the filter has the advantage of being capable of bending to give the filtering-column a curve to suit the purposes in hand.

In the form represented in Fig. 4 the filtering-sections are simply plain tubes, quite like those represented by G G', &c., in Fig. 3, and are held together by short tubular casings, (represented by H',) and which may be either of some flexible or rigid material, as may be found desirable, the several exterior casings H' being arranged to break joints with the interior tubular sections G G', &c.

In the form shown in Fig. 5 the sections are quite similar in their general form to those represented in Figs. 1 and 2, but instead of sliding the one within the other they are provided with screw-threads which enable them to be screwed successively together. For example, the lower tubular section I is provided at its upper portion with an internal screw-thread $i$, and the lower portion of the section I', which is made to fit within the upper portion of the section I, is provided with an exterior screw-thread $i'$, by means of which it may be screwed within the upper portion of the section I. The upper section in this form is made quite similar to the intermediate sections and is fitted to the nozzle $c$ of the supply-receptacle C by means of inserting a cork D with a tapered bore $d$.

The filter, as thus constructed, may be readily taken apart, section by section, for cleansing the filtering material or for inserting new strata of filtering material intermediate of the sections, and the column may be made longer or shorter at pleasure to suit different liquids to be filtered.

What I claim is—

A filter consisting of a column of separable tubular sections having their walls imperforate and strata of filtering material interposed between the adjacent ends of the successive sections forming when set up a continuous liquid-tight tube intercepted at intervals by filtering strata through which the liquid to be filtered is forced to successively pass, substantially as set forth.

WILLIAM MILES FOWLER.

Witnesses:
FREDK. HAYNES,
GEORGE BARRY.